United States Patent [19]

Matsumoto

[11] 4,174,897
[45] Nov. 20, 1979

[54] X-CLASS SYNCHRONIZATION CONTACT MEANS FOR ELECTRIC SHUTTERS

[75] Inventor: Kunio Matsumoto, Ageo, Japan

[73] Assignee: Copal Company Limited, Tokyo, Japan

[21] Appl. No.: 835,211

[22] Filed: Sep. 21, 1977

[30] Foreign Application Priority Data

Sep. 24, 1976 [JP] Japan .................. 128402[U]

[51] Int. Cl.$^2$ ............................................ G03B 15/05
[52] U.S. Cl. ...................................... 354/133; 354/147
[58] Field of Search ................... 354/129, 33, 139, 147

[56] References Cited

U.S. PATENT DOCUMENTS

| Re. 25,766 | 4/1965 | Lareau et al. .................. 354/139 |
| 3,699,859 | 10/1972 | Akiyama ...................... 354/133 X |
| 4,079,389 | 3/1978 | Hashimoto et al. ............. 354/139 X |

*Primary Examiner*—Michael L. Gellner
*Attorney, Agent, or Firm*—Cushman, Darby & Cushman

[57] ABSTRACT

An X-class synchronization contact means for electric camera shutters has a switch which is closed by a shutter opening release stroke or by initial motion of a shutter opening operation. The switch is connected to a flash synchronization contact in order to prevent accidental ignition of a flashing means either in the initial step of a camera shutter release operation or in an exposure warning step accompanying the camera shutter release.

6 Claims, 3 Drawing Figures

X-CLASS SYNCHRONIZATION CONTACT MEANS FOR ELECTRIC SHUTTERS

BACKGROUND OF THE INVENTION (a) Field of the Invention

This invention relates to flash synchronization means for electric shutters and more particularly to improvements in an X-class synchronization contact means.

(b) Description of the Prior Art

There is known an X-class flash synchronization controlling system in an electric shutter wherein is used a synchronization contact operated at the same time as the passing of an electric current to an electromagnet is cut off to start a shutter closing motion. In this kind of conventional system, such disadvantages as in the following are caused in practice. That is to say, by the chattering of a current source switch in an initial step of a camera release operation or by the switching of a switch in an exposure warning step, there will be caused a phenomenon that an electromagnet once placed in a current passing state will have the passing of the current momentarily cut off. At this time, a synchronization contact may operate and a fashing means may accidentally ignite before the shutter is opened.

SUMMARY OF THE INVENTION

An object of the present invention is to provide an X-class synchronization contact means for electric shutters wherein, in order to eliminate the defects of the above mentioned conventional system, during such preliminary operation steps as an initial step of a camera release operation and an exposure warning step, even if the passing of a current to an electromagnet is cut off, a synchronization contact will be held in a non-operatable state but, only in a shutter releasing stroke or in an initial step of a shutter opening operation, the synchronization contact will be converted to be in an operatable state.

According to the present invention, this object can be attained by providing a normally opened type switch to be closed in a shutter opening release step or in an initial period of a shutter opening operation and connecting this switch to a synchronization contact to be closed at the same time as the passing of a current to an electromagnet is cut off to close the shutter.

According to a favorable embodiment of the present invention, a synchronization contact is formed of a thyristor having a gate terminal connected to an electromagnet through a diode and capacitor and a normally opened type switch to be closed in a shutter opening release stroke or in an initial period of a shutter opening operation is connected to a cathode terminal of the thyristor.

According to another embodiment, the above mentioned switch is interlocked with a switch for operating a CR delay circuit determining an exposure time or is formed so as to be also a switch for a CR delay circuit.

Further, according to another embodiment, a switch for holding a thyristor in a non-operatable state is formed as a normally closed type switch to be opened in response to a shutter opening operation and is connected to a gate terminal of the thyristor.

Further, according to another embodiment, a synchronization contact is formed as a normally opened type mechanical switch to be closed by a reverse electromotive force generated in an electromagnet when the passing of a current to the electromagnet is cut off.

This and other objects of the present invention will become more apparent during the course of the following detailed description and appended claims.

DESCRIPTION OF THE PREFERRED EMBODIMENTS

Figure 1:
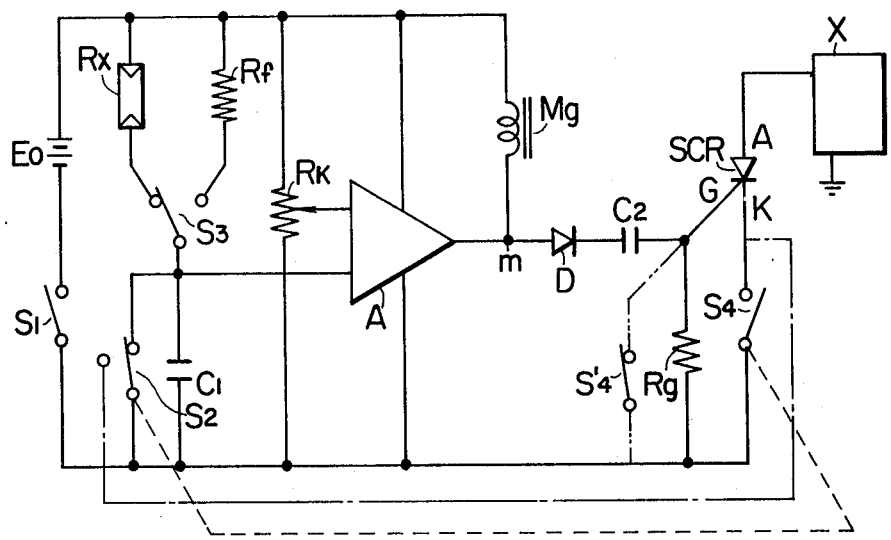
FIG. 1 is a wiring diagram showing an example of an electric shutter circuit in which a means according to the present invention is incorporated.

Referring to FIG. 1, symbol $E_0$ indicates a power source battery, $S_1$ indicates a current source switch, $R_x$ indicates such photoconductive element as CdS, $C_1$ indicates a capacitor forming a CR delay circuit for determining an exposure time in cooperation with the photoconductive element $R_x$ and $S_2$ indicates a normally closed type switch for starting the operation of the CR delay circuit and to be opened in response to the opening of shutter blades not illustrated. Symbol $R_k$ indicates a potentiometer for setting a reference voltage, A indicates a comparator having as both inputs the charging voltage of the capacitor $C_1$ and the reference voltage by the potentiometer $R_k$ and $M_g$ indicates an electromagnet controlled by the comparator A and serving to start the closing motion of the shutter blades not illustrated. Symbol $R_f$ indicates a resistor for setting at a fixed valve value (for example, 1/30 second) the exposure time determined by the CR delay circuit for a flash-photographing and to be connected to the capacitor $C_1$ by a changeover switch $S_3$ upon the flash-photographing. Symbol D indicates a diode, $C_2$ indicates a capacitor, $R_g$ indicates a resistor and SCR indicates a thyristor. A gate G is connected to one end m of the electromagnet $M_g$ through the capacitor $C_2$ and diode D. Symbol $S_4$ indicates a normally opened type switch to be closed in a shutter opening release stroke or in an initial step of a shutter opening operation. It is preferable that the switch $S_4$ is usually interlocked with the switch $S_2$ so as to be closed simultaneously with the starting of a shutter opening motion. Symbol X indicates an X-class flashing means which will be ignited when the thyristor SCR as a synchronization contact is placed in a conducting state.

As mentioned above, the switch $S_4$ is of a normally opened type to be closed in a shutter opening release stroke or in an initial step of a shutter opening operation. Therefore, at the time of closing the current source switch $S_1$ in the initial step of the camera release operation, the switch $S_4$ will be still placed in a non-opened state. Therefore, by the closing of the current source switch $S_1$, the output of the comparator A, that is, one end m of the electromagnet $M_g$ will fall down to be on the "Low" level and an electric current will be passed to the electromagnet $M_g$. In this case, once the current source switch $S_1$ happens to be opened by chattering, the potential of the point m will be elevated to be on the "HIGH" level by a reverse electromotive voltage generated in the electromagnet $M_g$ and a pulse signal will be given to the gate G but the thyristor SCR which is opened on the cathode K side will not conduct and will not ignite the flashing means X.

Figure 2:
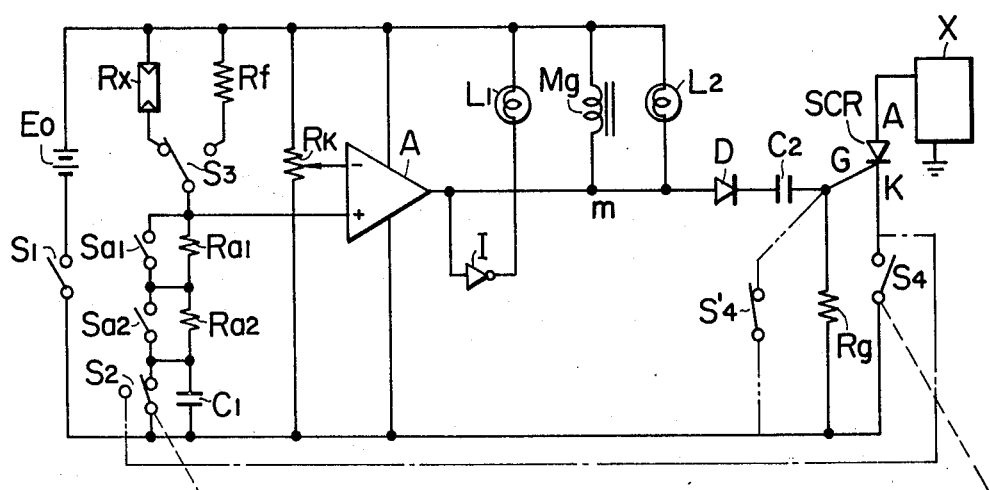
FIG. 2 is a wiring diagram showing another example of an electric shutter in which a means according to the present invention is incorporated.

FIG. 2 shows an example in which an exposure warning circuit is added to the circuit in FIG. 1. Symbols $Ra_1$ and $Ra_2$ indicate comparing resistors for exposure warning. $Sa_1$ and $Sa_2$ indicate normally opened type switches to be closed in turn following the closing of the current source switch $S_1$ in the initial step of the camera release operation. Symbol I indicates an inverter, $L_1$ indicates a camera-shake warning lamp and $L_2$ indicates a high-brightness warning lamp. According to this circuit, when the current source switch $S_1$ is closed in the initial step of the camera release, first the resistors $Ra_1$ and $Ra_2$ will be connected to a photoconductive element Rx and whether there is a danger of a camera-shake or not will be made known to the photographer by whether the lamp $L_1$ lights or not, then the switch $Sa_1$ will be closed, only the resistor $Ra_2$ will be connected to the photoconductive element Rx, whether there is a danger of an over-exposure or not will be made known to the photographer by whether the lamp $L_2$ lights or not and, at last, the switch $Sa_2$ will be closed to complete the exposure warning step. In this exposure warning step, when the resistance value of the photoconductive element Rx is smaller than the sum of the resistance values of the resistors $Ra_1$ and $Ra_2$ or is smaller than the resistance value of the resistor $Ra_2$, the output of the comparator A will rise to be on the "HIGH" level and a pulse signal will be given to the gate G of the thyristor SCR but, in this case, too, the switch $S_4$ is in the opened state and therefore the flashing means X will not ignite.

In the above mentioned embodiment, the switch $S_4$ is independently provided. However, a stationary contact may be provided adjacently to the switch $S_2$ and may be connected with the cathode K as shown by the one-dot chain lines in FIGS. 1 and 2 so that, when the switch $S_2$ opens the circuit including the capacitor $C_1$, its movable contact piece may contact the above mentioned stationary contact and the switch $S_2$ may be also used as the switch $S_4$. Also, the cathode K of the thyristor SCR may be connected to the negative pole of the battery $E_0$ through the current source switch $S_1$ and, as shown by the two-dot chain lines in FIGS. 1 and 2, a normally closed type switch $S'_4$ to be opened in the shutter opening release stroke or in the initial step of the shutter opening operation may be connected between the gate G and cathode K of the thyristor SCR.

Figure 3:
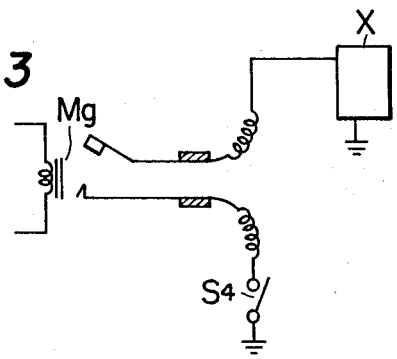
FIG. 3 is a partial wiring diagram showing a synchronization contact of a type different from that of the synchronization contact shown in FIGS. 1 and 2.

By the way, in the above mentioned embodiment, the synchronization contact is shown to use such semiconductor switch element as a thyristor. However, as shown in FIG. 3, it may be a normally closed type mechanical switch which will be opened while an electric current is being passed to the electromagnet Mg for controlling the closing of the shutter but will be closed by a reverse electromotive force generated in the electromagnet when the passing of the current is cut off.

The flash-photographing is made by fixing the exposure time by using the resistor Rf. The flashing means X can be properly operated as a daytime auxiliary light at the time of an automatic exposure photographing by utilizing the photoconductive element Rx.

Further, utilizing a de-energizing signal of the electromagnet Mg as a trigger of the synchronization contact is effective particularly to an electric shutter of a program type in which the shutter blades are also diaphragm blades.

I claim:

1. An X-class synchronization contact means for electric shutters comprising an electromagnet capable of being converted from an energized state into a de-energized state to start a shutter closing motion, a flash synchronization contact capable of being operated by an electrical signal associated with said electromagnet when said electromagnet is de-energized, and a first switch which is connected to said synchronization contact and which functions to prevent said synchronization contact from passing an electric current for erroneous flash synchronization during at least any preliminary operation step for the shutter release and which permits said synchronization contact to pass an electric current for flash synchronization by said electrical signal at the time said electromagnet is de-energized only after said first switch is operated.

2. An X-class synchronization contact means for electric shutters according to claim 1 wherein said synchronization contact is a thyristor having a gate terminal connected to said electromagnet and a cathode terminal connected to said first switch.

3. An X-class synchronization contact means for electric shutters according to claim 1 wherein said synchronization contact is a thyristor having a gate terminal connected to said electromagnet and said first switch is connected between the gate terminal and cathode terminal of said thylistor.

4. An X-class synchronization contact means for electric shutters according to claim 1 wherein said synchronization contact is formed as a mechanical switch and said first switch is connected in series with said mechanical switch.

5. An X-class synchronization contact means for electric shutters according to claim 1 wherein said first switch is interlocked with a second switch for operating a CR delay circuit to control the energizing time of said electromagnet.

6. An X-class synchronization contact means for electric shutters according to claim 1 wherein said first and second switches have a common movable contact piece.